May 8, 1951     H. B. H. COOPER ET AL     2,552,260
APPARATUS FOR THE MANUFACTURE OF MERCAPTOBENZOTHIAZOLE
Filed July 1, 1948
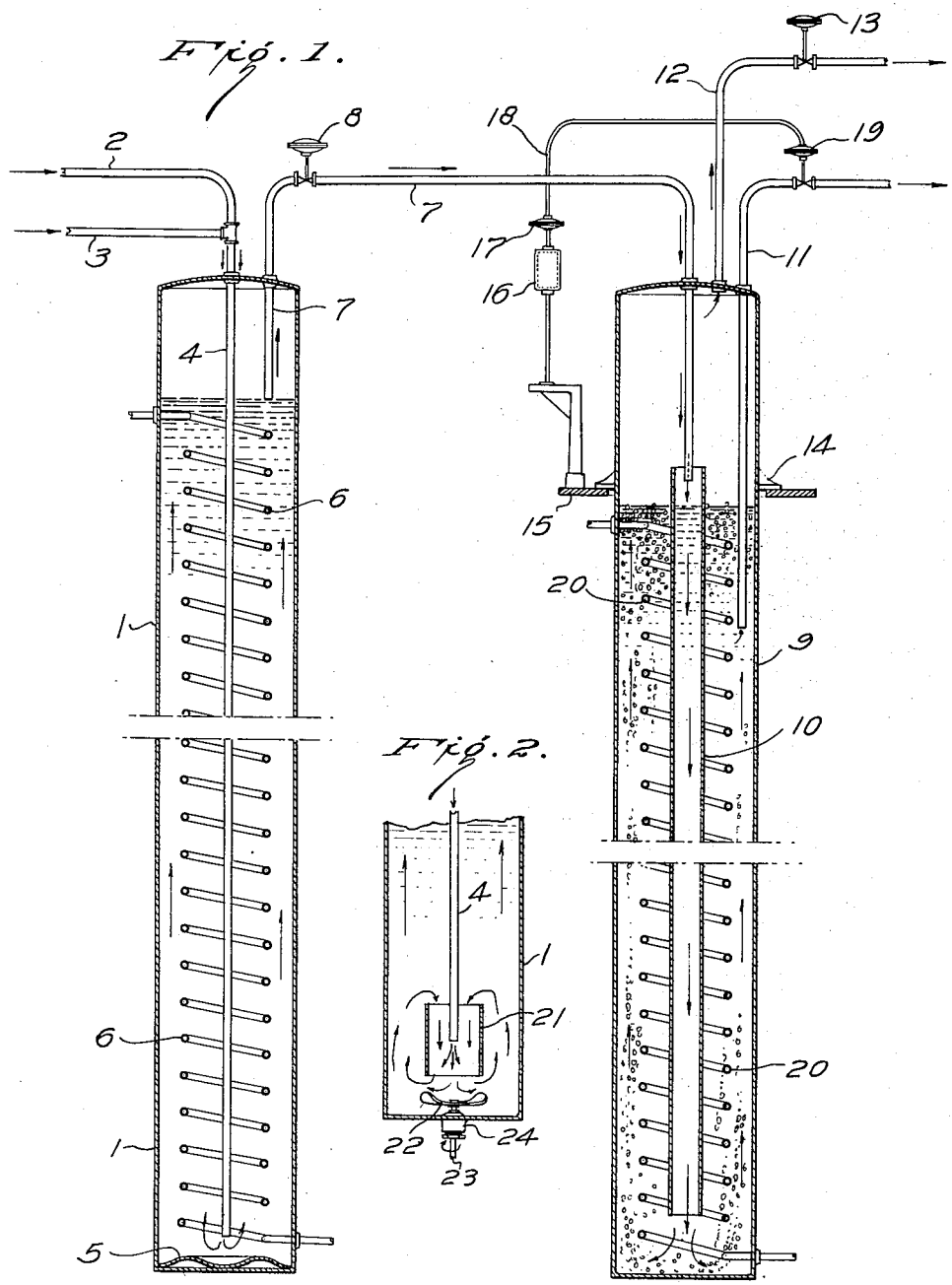
INVENTORS
HAL B. H. COOPER,
CARL E. MENSING,
BY Elmer W. Harmon
ATTORNEY Patented May 8, 1951

2,552,260

UNITED STATES PATENT OFFICE 2,552,260

APPARATUS FOR THE MANUFACTURE OF MERCAPTOBENZOTHIAZOLE

Hal B. H. Cooper, Bound Brook, and Carl E. Mensing, Somerville, N. J., assignors to American Cyanamid Company, New York, N. Y., a corporation of Maine Application July 1, 1948, Serial No. 36,344

3 Claims. (Cl. 23—290)

This invention relates to the producton of mercaptoarylthiazoles, particularly those such as 2-mercaptobenzothiazole. More specifically, the invention is concerned with a novel process and apparatus for the continuous production of such compounds and for the recovery of carbon disulfide used in the reaction mixture.

Mercaptoarylthiazoles, particularly mercaptobenzothiazoles, are well known compounds, widely used in industry. Because of the importance of such products, many processes for their production have been proposed. Among such processes, one which is typical and has been industrially developed on a large scale, is the production of 2-mercaptobenzothiazole based on the reaction of a mixture of aniline and sulfur dissolved in carbon disulfide.

Not all of the previously proposed procedures for this reaction have been entirely satisfactory. In the earlier stages of the art, production was carried out in batch operation. In U. S. Patent 1,911,716 a continuous process is disclosed. Other continuous processes since have been proposed. In none of these proposals has there been any satisfactory method whereby the carbon disulfide can be separated and recovered from the reaction mixture or the reaction products. Because of its intrinsic value and because it is used in excess and in appreciably large quantities, the demand remains for a process whereby it can be separated and recovered.

It is, therefore, a principal object of the present invention to develop a continuous process for the production of mercaptoarylthiazoles wherein any carbon disulfide mixed with the reaction product gases may be economically separated and recovered and to develop a suitable apparatus for the process. Further objects of the invention are to provide a novel, continuous single-stage production of 2-mercaptobenzothiazole from aniline, sulfur and carbon disulfide with provision for the separation of carbon disulfide from the resultant hydrogen sulfide.

These objects have been met by a procedure and apparatus in which preheated reactants are fed to a high pressure reactor; the reaction is carried out therein in the liquid phase at elevated temperature and pressure; the liquid and gaseous reaction products are throttled down in pressure and transferred to a separator and the separator is operated so as to discharge the carbon disulfide as vapor with the by-product gas whereas the mercaptoarylthiazole remains in, and is separately discharged from, the separator in molten condition. A feature of the invention is the discharge of the gas and vapor mixture from the separator under conditions of temperature and pressure such that the mixture when throttled down to pressures slightly above atmospheric is cooled sufficiently that substantially all the carbon disulfide is liquefied.

Operation of the process of the present invention may be more readily understood with reference to the accompanying drawings. In the latter, Figure 1 shows, in diagrammatic form, the vertical cross sections of a reactor and separator set up in a manner suitable for the conduct of the process of the present invention, and Figure 2 shows an additional useful modification of the bottom of the reactor. The process and apparatus combination, as used, is believed to be quite novel.

With reference to the drawing, it will be seen that a reactor 1 comprises a vertical elongated chamber. Conduits 2 and 3 are provided to introduce flows of the reactants from any suitable sources. These sources, not being part of this invention, are not shown. Conduits 2 and 3 are joined through a T connection to conduit 4 which enters through the top of reactor 1 and extends vertically downward therethrough, almost to the bottom thereof. A curved deflector plate 5 is located near the bottom of reactor 1, immediately below and at right angles to the lower or discharge end of conduit 4. A steam coil 6 is located within chamber 1 and around conduit 4. Coil 6 extends from a level near the bottom of chamber 1 to a height approximately that of the normal fluid level in that chamber. The coil is used to insure fluidity of the chamber's content. A discharge conduit 7 extends from an upper level in chamber 1 upwardly through the top of reactor 1, through a pressure-controlled valve 8 and downwardly through the top of and into a separator vessel 9. Flow in conduit 7 is governed by the pressure-controlled valve 8.

Separator 9 is also shown as, and usually will comprise, an elongated vertical chamber. As shown, separator 9 is provided with an annular inner sleeve 10 extending from a level slightly above the lower or discharge end of conduit 7 downwardly to a level near the bottom of the separator. Outside sleeve 10 is provided a liquid discharge conduit 11 extending from a level considerably below the discharge end of conduit 7 upwardly through the top of separator 9 and to any suitable receiver. The latter is not shown as it is conventional in form and is not a part of this invention. A gas discharge conduit 12 extends upwardly from the top of separator 9, through a pressure controlled expansion valve 13 and to another suitable receiver which again being conventional is not shown.

Separator 9 is provided with suitable flanges 14, or their mechanical equivalents, whereby separator 9 is fully supported by the platform of a platform scale 15, or its mechanical equivalent. Variations in the combined weight of separator 9 and its contents produce a proportional vertical displacement of the thus supported separator. Weight responsive mechanism 16 of supporting scale 15 produces a mechanical movement which is proportional to the movement of the separator 9. In turn this motivates a pressure adjuster 17. The latter, through conduit 18, controls liquid level maintaining pressure valve 19 in the discharge conduit 11. Separator 9 is also provided, through most of its height with a steam coil 20 surrounding sleeve 10.

In Figure 2, a modification of the reactor structure is shown. The reactor chamber 1 and inlet conduit 4 are the same as in Figure 1. However, a short annular sleeve 21 is provided around the lower end of conduit 4. Sleeve 21 extends a short distance above and below the end of conduit 4. Below sleeve 21 a mechanical agitator blade 22 is provided, being mounted on the end of and supported by a shaft 23 which enters chamber 1 through a suitable packing gland 24. The function of this arrangement is to produce a localized circulation and agitation of fluid near the bottom of chamber 1 and thus insure prompt and efficient initiation of the reaction.

Taking the typical reaction of aniline with sulfur in carbon disulfide as illustrative, the process of the present invention and the operation of the described apparatus is readily demonstrated. It should be borne in mind that the principal feature of the present invention is the separation and recovery of carbon disulfide from the by-product gases. In the illustrative case these will be substantially wholly hydrogen sulfide.

If the gas mixture leaving the separator is cooled to 20°–40° C. and a suitable high pressure and it is throttled through an expansion valve to about 5–15 lbs. per sq. in. pressure, the mixture can be cooled to about minus 40° C. At this temperature substantially all the carbon disulfide is liquefied. Hydrogen sulfide being more volatile is thus readily separated and may be taken from the recovery system containing only a small fraction of about 3% or less of the recoverable carbon disulfide. The separation pressure should be about 300–400 lbs. per sq. in. above atmospheric. Below about 300 lbs. per sq. in., there is not sufficient cooling developed; above about 400 lbs. per sq. in., both carbon disulfide and hydrogen sulfide begin to dissolve in excess in the molten mercaptobenzothiazole.

A principal feature of the present invention is, therefore, the continual and complete separation of the mercaptobenzothiazole from the carbon disulfide and by-product gas under conditions at which mercaptobenzothiazole remains molten but the average separation pressure is about 350 lbs. per sq. in. in order that the carbon disulfide of the carbon disulfide-hydrogen sulfide mixture may be liquefied.

With these facts in mind, the operation of the process and apparatus of this invention may be typified in the following way. Aniline under pressure and from a suitable source will be brought through conduit 2 and sulfur in carbon disulfide will be brought to the apparatus through conduit 3. These liquids will have been preheated to about 240° C. and be under pressure of about 1200 lbs. per sq. in. These temperatures and pressures may be varied somewhat. A minimum preheat temperature is about 220° C. This may be increased to as high as 300° C., if the time in the reactor is short. About 260° C. is perhaps preferable as the ordinary upper limit. Similarly, the pressure should not go below about 1000 lbs. per sq. in. if the reactants are to stay properly dissolved. There is no immediate upper limit on the pressure. However, above about 1500 lbs. per sq. in. the cost for the necessary pressure equipment becomes excessive.

These liquids, preheated and under pressure, are combined and forced by the pressure through conduit 4 to the bottom of the reactor, being discharged through the open lower end of conduit 4. The effect of curved reflector plate 5 is to distribute the flow over the bottom of the reactor and start the upward rise at a uniformly distributed rate. If the arrangement of Figure 2 is used, the agitation and recirculation at the bottom of the autoclave quickly initiates reaction and again the upward flow is uniformly distributed.

The reacting mixture, under force of the incoming reactants moves upwardly through the reactor. Evolution of hydrogen sulfide gas continues throughout the reaction and provides sufficient agitation of the liquids. A normal liquid level develops at about the level of the intake to discharge conduit 7, a gas cushion forming above this. When the pressure becomes sufficiently high, alternate discharge of gas and liquid through conduit 7 is permitted by the pressure-reducing valve 8. The latter is set to discharge at a reduced pressure of 300–400 lbs. per sq. in., usually about 350 lbs. per sq. in.

Gas and/or liquid discharged by valve 8, enters separator 9, being discharged from conduit 7 into the inside of sleeve 10 at a height above the normal liquid level. The discharged material passes rapidly down through sleeve 10 to the bottom of the separator and back up through the annular space between the sleeve and outer shell. Freezing is prevented by the steam coil 20. Separation of gas and liquid is completed therein, the hydrogen sulfide and remaining carbon disulfide forming an upper gas cushion.

As was noted above, the separator is mounted on a weight-responsive apparatus such as a platform scale 15 which in turn, through pressure-controller 17 and pressure-controlled valve 19, regulates the liquid discharge through conduit 11. The molten product is passed at about atmospheric pressure to a suitable receiver. The latter forms no part of the present invention. The receiving system for example may be pelletizing equipment in which the product is solidified with water or may be a process in which it is reacted to form a salt such as sodium mercaptobenzothiazole.

The gas cushion of the liquid, at about 350 lbs. per sq. in. pressure, is throttled down through pressure controlled expansion valve 13 to about 5–15 lbs. per sq. in. At the lower pressure, as noted above, substantially all the carbon disulfide is liquefied. To insure complete separation, the gas-liquid mixture usually, but not necessarily, is passed to a suitable still or other separator, which again may be conventional and is therefore not illustrated. Therein the more volatile hydrogen sulfide is driven off with a very low $CS_2$ content and the liquid carbon disulfide recovered.

The process and apparatus is not necessarily limited to the particular reaction of aniline, sulfur and carbon disulfide. It is equally applicable to other pressurized reactions wherein two gases, one of which is considerably more easily liquefied than the other, must be separated. A number of similar reactions involving hydrogen sulfide and carbon disulfide are noted in U. S. Patent No. 2,247,894.

It will be apparent also that the temperatures and pressures specifically discussed for the illustrative example may be varied within practical limits to meet the desired operation of the process. They may be varied not only in accordance with the desire to change conditions for this reaction but also in accordance with conditions controlled by the use of other reactants in other reactions. The process is therefore of general application in the production of mercaptoarylthiazoles as well as to mercaptobenzothiazoles.

We claim:

1. In combination, a pressure reactor, a feeder conduit centrally located therein extending vertically downward to a level near the bottom thereof; a vertically elongated separatory vessel; balance means supporting said vessel and permitting vertical motion thereof; a transfer conduit extending from an upper level in said reactor into said separatory vessel and terminating downwardly and centrally at an upper level in said vessel; a pressure-reducing valve in said transfer conduit; an inner annular sleeve in said separatory vessel extending from a lower level of said vessel upwardly to a level above and surrounding the terminus of said transfer conduit, the inner diameter of said sleeve being larger than the outer diameter of said conduit; a fluid discharge conduit extending out of said vessel, the inlet to said discharge conduit being located outside said sleeve and at a level below the terminus of said transfer conduit; a liquid-level-maintaining valve in said fluid discharge conduit; a valve-setting means attached to said liquid-level-maintaining valve; a motivating means attached to said valve-setting means; a proportioning and actuating means cooperating with said vessel and said motivating means responsive to the motion of said vessel; a gas discharge conduit extending from a level higher than the level of said terminus of said transfer conduit; and a pressure reducing valve in said gas discharge conduit.

2. An apparatus according to claim 1 wherein the pressure reactor is provided with an annular sleeve surrounding the lower end of the feeder conduit thereof, and with a mechanical agitator positioned below said sleeve to force liquid through said sleeve.

3. In combination, a pressure reactor, a feeder conduit centrally located therein extending vertically downward to a level near the bottom thereof; a vertically elongated separatory vessel; balance means supporting said vessel and permitting vertical motion thereof; a transfer conduit extending from an upper level in said reactor into said separatory vessel and terminating downwardly and centrally at an upper level in said vessel; a pressure-reducing valve in said transfer conduit; an inner annular sleeve in said separatory vessel extending from a lower level of said vessel upwardly to a level above and surrounding the terminus of said transfer conduit, the inner diameter of said sleeve being larger than the outer diameter of said conduit; a fluid discharge conduit extending out of said vessel, the inlet to said discharge conduit being located outside said sleeve and at a level below the terminus of said transfer conduit; a liquid-level-maintaining valve in said fluid discharge conduit; a pressure-motivated actuating means attached to said liquid-level-maintaining valve; a pressure-producing means cooperating with and responsive to motion of said vessel; pressure-transfer means connecting said pressure-producing means and said pressure-motivated means; a gas discharge conduit extending from a level higher than the level of said terminus of said transfer conduit; and a pressure reducing valve in said gas discharge conduit.

HAL B. H. COOPER.
CARL E. MENSING.

REFERENCES CITED

The following references are of record in the file of this patent:

UNITED STATES PATENTS

| Number | Name | Date |
|---|---|---|
| 158,268 | Freeland | Dec. 29, 1874 |
| 449,064 | Bell | Mar. 24, 1891 |
| 906,532 | Jensen | Dec. 15, 1908 |
| 1,059,060 | McLaughlin | Apr. 15, 1913 |
| 1,432,208 | Reynolds | Oct. 17, 1922 |
| 1,467,324 | Taylor | Sept. 11, 1923 |
| 1,911,716 | Saunders | May 30, 1933 |
| 2,247,894 | Smith | July 1, 1941 |
| 2,332,527 | Pyzel | Oct. 26, 1943 |
| 2,419,275 | Metzger | Apr. 22, 1947 |
| 2,421,451 | Balcar | June 3, 1947 |